Nov. 1, 1927.
W. W. TUTTLE ET AL
1,647,975
BRAKE MECHANISM
Filed April 26, 1923    2 Sheets-Sheet 1
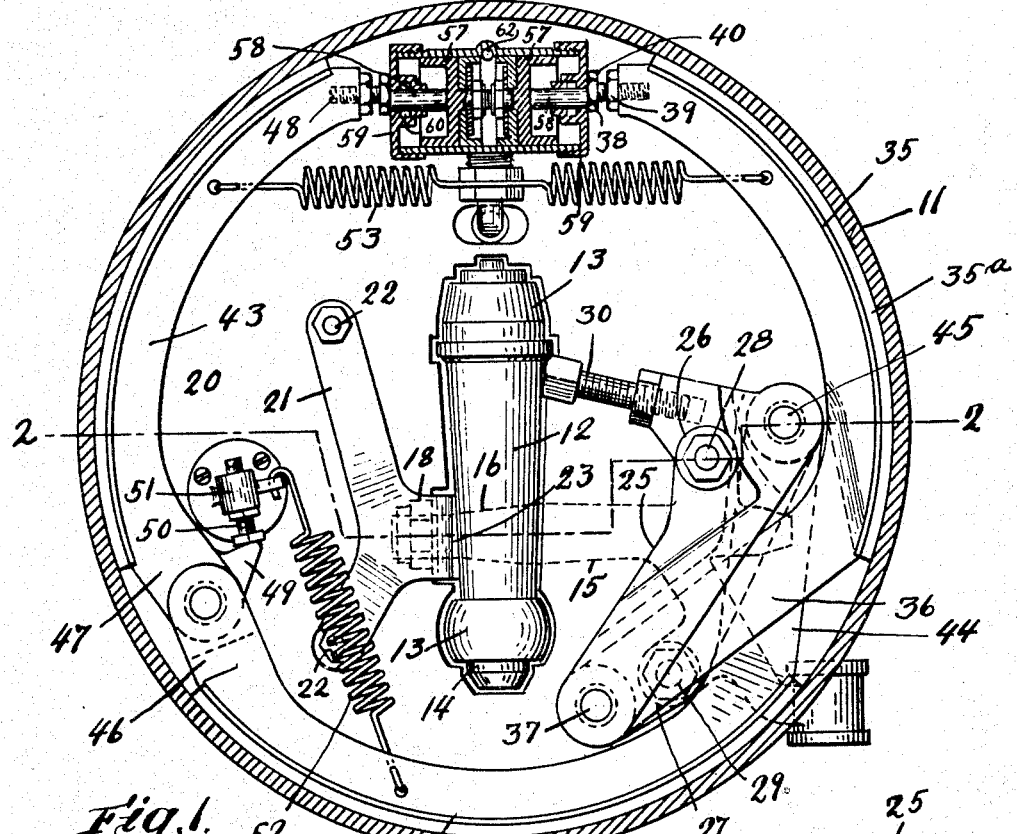
Fig. 1.
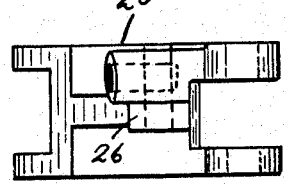
Fig. 7.
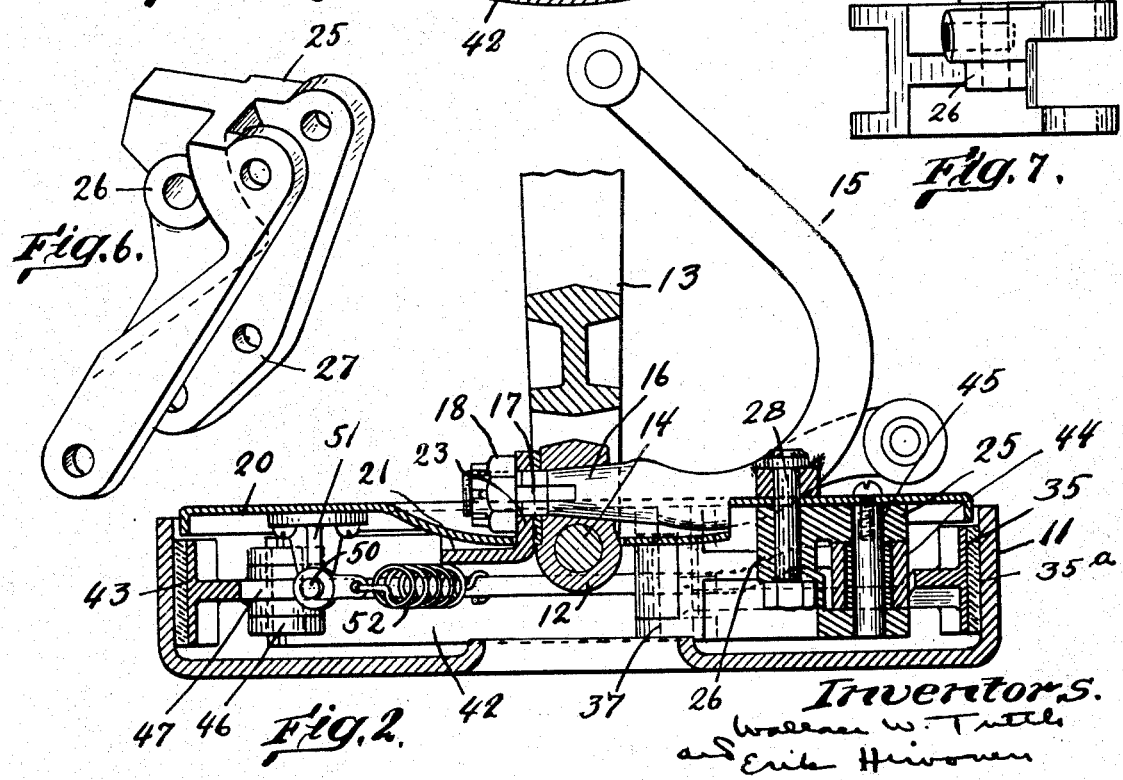
Fig. 6.
Fig. 2.
Inventors

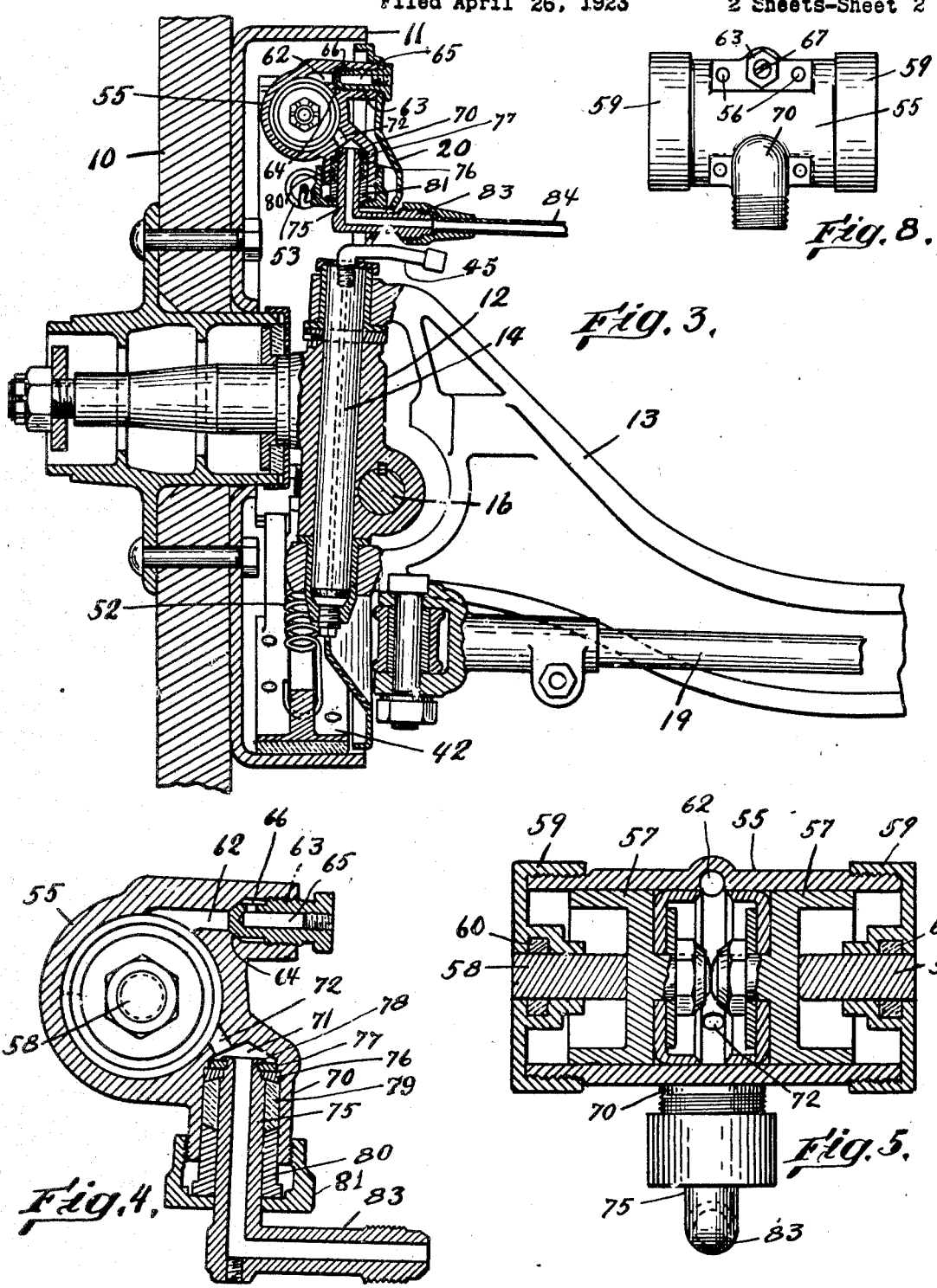

Patented Nov. 1, 1927.

1,647,975

UNITED STATES PATENT OFFICE.

WALLACE W. TUTTLE AND ERIK HIRVONEN, OF DETROIT, MICHIGAN, ASSIGNORS TO THE STEEL WHEEL CORPORATION, A CORPORATION OF NEW YORK.

BRAKE MECHANISM.

Application filed April 26, 1923. Serial No. 634,855.

This invention relates to brake mechanism particularly adapted, although not necessarily limited, to automobiles.

An object of this inventon is the provision of improved hydraulic operating means for the brake elements.

A further object is the provision of brake mechanism arranged for the steering wheels of an automobile.

A further object is generally to improve the construction and operation of brake mechanisms.

Fig. 1 is a sectional elevation of brake mechanism embodying the invention applied to the steering wheel of an automobile.

Fig. 2 is a section along line 2—2 of Fig. 1.

Fig. 3 is a vertical section of Fig. 1.

Fig. 4 is an enlarged transverse section through the hydraulic brake-actuating cylinder unit.

Fig. 5 is a longitudinal section of Fig. 4.

Fig. 6 is a perspective view of a supporting bracket for the brake shoes.

Fig. 7 is a plan view of Fig. 6.

Fig. 8 is a front elevation of the hydraulic brake-actuating unit.

As here shown, the brake mechanism embodying the invention is applied to one specific type of steering wheel of an automobile, but is or may be equally applicable to other types. The wheel 10 has the brake drum 11 fixed to it and is rotatable on the steering knuckle 12, which latter is pivotally secured to the front axle 13 by the king pin 14, which latter is fixed in the steering knuckle and is journalled in the upper and lower arms of the axle. A steering arm 15 is secured to said steering knuckle and has a tapered end-portion 16 which is received in a corresponding recess in the knuckle and a key 17 and a nut 18 serve to maintain said arm fixed to said knuckle. A cross-rod 19 is or may be pivotally connected to said steering arm and serves to connect the two steering wheels as is usual practice.

The wheel herein illustrated is the left wheel of the automobile but the brake mechanism may be applied to the right wheel or other wheels, without departure from the spirit of the invention.

The brake mechanism is or may be carried on a stationary support which, as here shown, may comprise a disc or plate 20 which is adapted to be received within the open inner end and closely conform with the inner periphery of the brake drum, whereby to enclose and protect the brake elements. Said supporting plate may be secured to the steering knuckle and swivel therewith. The plate securing means may include a bracket having the divergent arms 21 which are disposed on the inner face of said plate and secured thereto by suitable means as the bolts 22. Said bracket may have a lower extension 23 which is extended through said plate and over the threaded end of said steering arm 15 and may be detachably clamped fixedly to the steering knuckle 12 by the nut 18, which latter is or may be threaded on the end of said steering arm. The plate securing means may also include a bracket 25 which is disposed on the inner face of said plate on the opposite side of said steering knuckle; and said bracket 25 is or may be formed or provided with the bosses 26 and 27 through which securing bolts 28 and 29 are or may be passed. Said bolts are or may be threaded into lugs formed on the steering arm 15 and serve to clamp said bracket fixedly yet detachably to the steering arm and with said supporting plate between both. A compression or thrust screw 30 may be adjustably threaded in said bracket and bear forcibly against the steering knuckle, whereby to assist in supporting said plate 20 to resist rotation when the brake is applied.

The brake mechanism includes two sets of brake shoes disposed within the brake drum 11 and adapted frictionally to engage the inner periphery thereof. One set of brake shoes is adapted more particularly to have a maximum braking effort to resist forward motion of the automobile, and the other set to resist more particularly rearward motion of the automobile, although both sets of brakes are effective in either direction of movement of the automobile. Because of the reduced duty of the brake to resist rearward motion, the set designed more particularly for this purpose is provided with but one brake shoe although the brake shoes of the set adapted more particularly to resist forward motion can be duplicated in the other set, as will be apparent hereinafter.

The brake shoe 35 is adapted to have a maximum braking effort to resist rearward motion. Said brake shoe is substantially arcuate in form and may have a suitable friction lining 35ᵃ which is adapted to engage the inner periphery of the brake drum 11. Said brake shoe may be disposed in the upper rear portion of the space enclosed by the brake drum and said supporting plate 20. An arm 36 is or may be extended inwardly and downwardly from the lower end of said brake shoe and be pivotally connected, by the pin 37, with the lower end of the fixed bracket 25. The upper end of said brake shoe may be provided with adjusting means by which wear of the brake lining may be compensated for and said adjusting means may include the adjusting screw 38 which is or may be screw-threaded into the end of the brake shoe and has a check nut 39, or other suitable means, to hold said screw securely in adjusted position. Said screw may be provided with an enlarged head 40 against which the brake-actuating mechanism, hereinafter to be described, is adapted to bear, whereby to force the brake shoe into frictional engagement with the brake drum.

Preferably the dimensions of said brake shoe and the disposition of its pivotal support is such that the wear on the brake lining is or may be substantially uniform throughout its extent and, for this purpose, the arrangement is or may be such that all parts of the surface of the brake lining move over substantially equal distances to engage the brake drum.

The set of brakes to resist forward movement of the automobile with maximum effect may include the brake shoe 42 and the loading brake shoe 43 a function of which is hereinafter described; and said brake shoe 35 also has effective braking effect. Said brake shoe 42 is approximately similar to the shoe 35 and the arm 44 of said shoe 42 may be extended upwardly and be pivoted to the pin 45 carried by said fixed bracket 25. The forward end of said brake shoe 42 is or may be formed or provided with a lug 46 to which the lower arm 47 of said loading shoe 43 is pivotally connected. Said loading brake shoe 43 is or may be approximately similar in construction and arrangement to said brake shoes 42 and 35. The upper end of said loading brake shoe may be provided with adjusting means similar to the adjusting means carried by said shoe 35, and said means may include the screw 48. Said arm 47 may be formed with a lug 49 which is adapted to bear against an adjusting screw 50, which latter is or may be secured adjustably in a bracket 51 carried by said supporting plate 20, whereby the brake shoe 42 may be adjusted for wear. A tension spring 52 may be extended between said bracket and said shoe 42 whereby normally to hold said shoe yieldingly in retraced position free from contact with the brake drum. A tension spring 53 is or may be extended between the free ends of said loading brake shoe 43 and the reverse brake shoe 35 whereby to hold said shoes yieldingly in retracted position away from the brake drum and against the brake-actuating mechanism. The brake mechanism including the brake shoes 43, 42 and 35 is approximately as described in a co-pending application of Erik Hirvonen Serial No. 634,822 filed April 24, 1923.

The action of the loading brake shoe 43 is such that, when pressure is applied on the brake, the shoe is brought into frictional engagement with the brake drum. As the drum rotates, it tends to carry the brake shoe 43 with it, and, consequently, forces said shoe against the associated brake shoe 42, thereby to increase its pressure against the brake drum over and above that pressure caused directly by the brake-actuating mechanism; and the increase of pressure caused by the loading shoe will be a function of the speed of the driver.

The brake actuating mechanism is preferably in the compartment enclosed by the brake drum 11 and the supporting plate 20 and between the proximate ends of said brake shoes 43 and 35 and is arranged to force the ends of said shoes outwardly whereby to apply the brake. Said mechanism is or may be a self-contained unit which is secured detachably to the supporting plate 20 and in accordance with this invention is free from positive connection with the brake shoes. Said mechanism includes a horizontal hydraulic cylinder 55 which is or may be secured to the inner face of said supporting plate by suitable means, as the bolts 56, which bolts are or may be threaded into top and bottom flanges of said cylinder. Said cylinder is or may be disposed axially in line with and between the adjusting screws 48 and 38 of said brake shoes 43 and 35; and the ends of said cylinder may serve as abutment stops adapted to be engaged by the ends of said brake shoes, to define the retracted position thereof. Opposing and free pistons 57 may be disposed within said cylinder and are movable outwardly under influence of fluid pressure to actuate the brake mechanism. End caps 59 are or may be removably screw-threaded on the ends of said cylinder and pins 58 are or may be slidably extended through said end caps and packing or dust-excluding glands 60. Said pins 58 are preferably free from positive connection with the ends of the brake shoes and also with the pistons and are adapted to bear against both. This arrangement is particularly desirable for one reason that any eccentric pressure between the pins and brake shoes is taken care of by the pins alone and without any tendency toward angular or tilting movements of the pistons in the cylinder, as might result, otherwise. Said rods are adapted to bear against the enlarged ends of said adjusting screws 48 and 38 of said brake shoes 43 and 35 and, when fluid pressure is applied to said cylinder, to force the ends of said brake shoes outwardly against the brake drum, whereby to actuate the brake. When the fluid pressure is released, said spring 53 serves to move the brake shoes and the pistons inwardly to their respective retracted positions.

Preferably the pistons and pins are free from positive connection with the brake shoes and, with this arrangement, the cylinder unit may be removed from its position between the shoes without altering the adjustment of the brake shoes. This arrangement is also advantageous in that the stroke of the pistons is or may be uniform, regardless of wear of the brake shoes, and consequently the unit may have a small axial dimension.

The cylinder, and the fluid pressure system connected therewith, may be initially purged of air through the passage 62, which is or may be in communication with, preferably, the highest part of the interior of the cylinder between the pistons, and said passage is or may be normally sealed by the screw valve 63. Said valve may have a valve seat 64 which is adapted to close said passage, and may also have the longitudinal passage 65 in it which may communicate with said purging passage, when the valve is opened, by means of a passage 66 in the side wall of the valve.

The brake mechanism, including the hydraulic cylinder, is adapted to swivel with the steering wheel and means including a swivel connection is or may be provided to connect said cylinder with the source of fluid pressure, which latter is or may include a fluid pump-cylinder, not shown, operated by the driver of the automobile to supply fluid under pressure to actuate the brake actuating cylinder 55. Said cylinder 55 is or may be provided with a boss 70 which is or may be extended laterally and downwardly from the outer side of the cylinder and disposed over and spaced above the upper end of the king pin 14, and preferably substantially axially coincident therewith. Said boss is or may be formed with a vertical recess 71 therein which also is or may be substantially axially coincident with the axis of said king pin; and said recess may communicate with the interior of the cylinder by means of a passage 72 in the cylinder wall, which passage opens into the cylinder between the pistons therein.

An L-shaped fluid connector is or may be disposed with the upper arm 75 thereof received in said recess and retained detachably therein by means which may include a packing; and said packing is or may be adapted to permit relative angular movement between said connector and the cylinder and yet seal the joint against fluid leakage thereat. Said packing means may include a packing disc 76 which is received on a reduced shoulder at the upper end of said arm 75 and is or may be retained thereon by a second and superposed disc 77, which latter is or may be retained on said arm by the outwardly formed flange 78 thereof, which flange is extended outwardly above said disc 77. A packing 79 of suitable material may be disposed in the recess 71 of said cylinder boss about the arm 75 and beneath said packing disc 76; and a packing gland 80 may be disposed on said arm beneath said packing. A gland nut 81 may be screw-threaded on said boss and serve to press said gland against the packing, whereby to maintain it in fluid-tight engagement with said boss and also with said arm 75.

The lower arm 83 of said connector is or may be extended outwardly between said boss and said king pin and said lower arm may be suitably formed to receive a preferably flexible, fluid conductor 84, which may extend to the pump cylinder, not shown.

With this arrangement the steering wheel and its brake mechanism may swivel about the axle without any substantial and corresponding movement of the connector and the conductor 84.

A short nipple 45 may be disposed in the space between said connector and the upper end of the king pin 14 and threaded into the upper end of the lubricating passage therein, whereby to provide for lubricating the bearings of said king pin.

The invention herein set forth is also adapted as an attachment for existing automobiles or similar vehicles and the structure may be modified without departing from the spirit of the invention.

Copending divisional applications Serial Numbers 222,898 and 222,899, both filed September 29, 1927, claim certain features not herein claimed.

This application has common subject matter with application Serial No. 5,129, filed by Erik Hirvonen January 27, 1925, which is a substitution of the above mentioned application of Erik Hirvonen, Serial No. 634,822, filed April 24, 1923.

We claim:

1. Brake mechanism having the combination of a removable brake element, and a removable fluid-pressure-actuated piston for actuating said brake element, and wear-adjusting means carried by said brake element and acted on by said piston.

2. Brake mechanism having the combination of a removable brake element, and a fluid-pressure-actuated piston free from positive connection with said brake element disposed adjacent and arranged to transmit pressure to said brake element and actuate it to set the brake, said brake element including wear-adjusting means at its free end disposed to receive the pressure from said piston.

3. Brake mechanism including the combination of a movable brake element having an adjusting screw at a free end thereof, and fluid-pressure actuating means including a cylinder disposed adjacent the end of said brake element having a piston provided with a member arranged to engage said adjusting screw and actuate said brake element, whereby to set the brake.

4. Brake mechanism including the combination of a movable brake element having an adjusting screw at a free end thereof, and fluid-pressure actuating means including a cylinder disposed adjacent the end of said brake element having a piston provided with a member arranged to engage said adjusting screw and actuate said brake element, whereby to set the brake, and a spring associated with said brake element and piston to restore both to retracted position.

5. Brake mechanism including the combination of a pivoted brake element having a free end, wear-adjusting means including an adjusting screw threaded in the free end of said pivoted brake element, and fluid-pressure brake-actuating means including a cylinder disposed adjacent the free end of said brake element having a piston provided with a member arranged to engage said adjusting screw and actuate said brake element whereby to set the brake.

6. Brake mechanism including the combination of a pivoted brake element having a free end, wear-adjusting means including an adjusting screw threaded in the free end of said pivoted brake element, and fluid-pressure brake-actuating means including a cylinder disposed adjacent the free end of said brake element having a piston provided with a member arranged to engage said adjusting screw and actuate said brake element whereby to set the brake, and means including a spring connected with said brake element arranged to restore said brake element and piston to retracted normal position.

7. Brake-mechanism including a brake element adapted to have a variable extent of movement, fluid-pressure brake-actuating means including a fixedly-supported cylinder and a piston therein having a fixed extent of stroke, and adjusting means carried entirely by said brake element and free from positive connection with said piston arranged to adjust the extent of movement of said brake element to the extent of stroke of said piston, said piston provided with a member disposed directly to engage said adjusting means.

8. Brake mechanism including the combination of a brake drum, a brake-shoe having a fixed pivotal support for one end thereof arranged to engage said drum frictionally, a loading brake shoe arranged to bear against said drum and be moved thereby to actuate said first brake shoe, and fluid-pressure actuated means including a piston provided with a member arranged to bear directly against and move said loading brake shoe into frictional engagement with said brake drum, said piston being free from attachment to said loading brake shoe, whereby to permit free circumferential movement of said loading brake shoe when bearing against said brake drum.

9. Brake mechanism including the combination of a brake drum, two pivoted brake shoes engageable with said drum, and having proximate free ends, and fluid-pressure actuating means including a cylinder disposed between said free ends of said brake shoes, and opposed pistons in said cylinder each of which is arranged to be moved outwardly and provided with a member to engage directly a free end of a brake shoe, whereby to actuate said brake, the ends of said brake shoes, in the retracted position thereof, being arranged to bear against said cylinder, free from said pistons.

10. Brake mechanism including the combination of a brake drum, two pivoted brake shoes engageable with said drum and having proximate free ends, and fluid-pressure actuating means including a cylinder disposed between said free ends of said brake shoes and opposed and free pistons disposed within said cylinder arranged to be moved outwardly to exert pressure on and actuate said brake shoes, and wear adjusting means interposed between said brake shoes and said pistons arranged to compensate for wear of said shoes while maintaining unchanged the extreme positions of said pistons within said cylinder.

11. Brake mechanism including the combination of a brake drum, two pivoted brake shoes engageable with said drum and having proximate free ends, adjusting means carried by the free ends of said brake shoes, and fluid-pressure actuating means including a cylinder disposed between said free ends of said brake shoes, and opposed and free pistons disposed in said cylinder arranged to be moved outwardly to exert pressure on said adjusting means and actuate said brake shoes.

12. Brake mechanism comprising the combination of a brake drum, two pivoted brake shoes engageable with said drum and having proximate ends, and fluid-pressure actuating means including a cylinder disposed between said proximate ends and forming an abutment against which said brake shoes are in direct contact in the retracted position thereof, means including a spring arranged to hold said brake shoes yieldingly against said cylinder, and opposed and free pistons disposed within said cylinder arranged to be moved outwardly and exert pressure against the ends of said brake shoes, whereby to move said brake shoes against said brake drum.

13. Brake mechanism comprising the combination of two brake shoes having proximate ends, a fixed support, and brake actuating means having means removably securing it to said support and comprising a cylinder, and opposed pistons in said cylinder provided with members arranged to engage said proximate ends of and actuate said brake shoes, said actuating means comprising a removable unit free from positive operative connection with and arranged to be removed from operative position independently of said brake shoes.

14. Brake mechanism comprising the combination of a fixed support, a supporting member pivoted to said fixed support, a brake drum rotatable on said supporting member, a brake shoe stationarily supported by said supporting member and engageable with said brake drum, hydraulic actuating means for said brake shoe including a cylinder fixed to said supporting member and movable therewith, a piston within said cylinder arranged to actuate said brake shoe, and a fluid swivel connection with said cylinder arranged to swivel substantially in line with the pivotal axis of said supporting member.

15. Brake mechanism including the combination of an axle, a steering knuckle, a king pin pivotally connecting said steering knuckle and axle, a brake drum rotatable on said steering knuckle, a support fixed to said steering knuckle and adapted to move therewith, a brake shoe pivoted to said support and arranged to engage said brake drum, and hydraulic actuating means for said brake shoe including a cylinder fixed to said support above said king pin, a piston disposed within said cylinder and engageable with said brake shoe to actuate it, and a fluid connector connected pivotally with said cylinder above and substantially in line with the axis of said king pin.

16. Brake mechanism including the combination of an axle, a steering knuckle, a king pin pivotally connecting said steering knuckle and axle, a brake drum rotatable on said steering knuckle, a support fixed to said steering knuckle and adapted to move therewith, a brake shoe pivoted to said support and arranged to engage said brake drum, and hydraulic actuating means for said brake shoe including a cylinder fixed to said support above said king pin, a piston disposed within said cylinder and engageable with said brake shoe to actuate it, said cylinder having a boss disposed above said king pin, and a recess in said boss arranged substantially co-axial with said king pin and having communication with the interior of the cylinder, an L-shaped fluid connector having one arm rotatably disposed within said recess and substantially co-axial therewith and having its other arm extended outwardly between said boss and king pin, and packing means disposed in said recess about said first arm.

17. Brake mechanism comprising the combination of a steering knuckle having a steering arm fixed thereto, a brake drum rotatable on said steering knuckle, a fixed supporting plate carried by said steering knuckle and disposed at one end of said brake drum, a bracket fixed to said plate and having an extension through which said steering arm is passed, a nut on said steering arm arranged to clamp said extension against said steering knuckle, a second bracket having means securing it to said plate and steering arm, and brake shoes and hydraulic actuating means for said brake shoes carried by said supporting plate.

18. Brake mechanism comprising the combination of a steering knuckle having a steering arm fixed thereto, a brake drum rotatable on said steering knuckle, a fixed supporting plate carried by said steering knuckle and disposed at one end of said brake drum, a bracket fixed to said plate and to said steering knuckle on one side thereof, a second bracket disposed on the opposite side of said steering knuckle having means securing it to said plate and said steering arm, brake shoes pivoted to said second bracket, and hydraulic actuating means fixed to said plate and including a cylinder and pistons in said cylinder arranged to move said shoes into engagement with said brake drum.

19. Brake mechanism comprising the combination of a steering knuckle having a steering arm fixed thereto, a brake drum rotatable on said steering knuckle, a fixed supporting plate carried by said steering knuckle and disposed at one end of said brake drum, a bracket fixed to said plate and to said steering knuckle on one side thereof, a second bracket disposed on the opposite side of said steering knuckle having means securing it to said plate and said steering arm, a thrust screw threaded in said second bracket arranged to bear against said steering knuckle, brake shoes pivoted to said second bracket, and hydraulic actuating means fixed to said plate and including a cylinder and piston in said cylinder arranged to move said shoes into engagement with said brake drum.

20. Brake mechanism comprising the combination of a brake drum, brake shoes engageable with said drum and having proximate ends, a fixed supporting member, free pins carried by said supporting member between and free from positive connection with said proximate ends of said brake shoes and arranged to be forced against said proximate ends of said brake shoes, and means to actuate said pins.

21. Brake mechanism comprising the combination of a brake drum, brake shoes engageable with said drum and having proximate ends, a fixed supporting member disposed between the ends of said brake shoes, free pins carried by said supporting member between and free from positive connection with said proximate ends of said brake shoes and arranged to be forced against said proximate ends of said brake shoes, and means to actuate said pins.

22. Brake mechanism comprising the combination of a brake drum, brake shoes engageable with said drum and having proximate ends, free pins disposed between and free from positive connection with said proximate ends and brake shoes and arranged to be forced against said proximate ends of said brake shoes, and means to actuate said pins.

23. Brake mechanism comprising the combination of a brake drum, brake shoes engageable with said drum and having proximate ends, free pins disposed between and free from positive connection with said proximate ends and brake shoes and arranged to be forced against said proximate ends of said brake shoes, and hydraulic means to actuate said pins, said hydraulic means being free from positive connection with said free pins.

24. Brake mechanism comprising the combination of a brake drum, brake shoes engageable with said drum and having proximate free ends, brake actuating means comprising pins free from positive connection with said brake shoes disposed between the proximate ends thereof, and actuating means for said brake shoes including means free from positive connection with said pins arranged to force said pins outwardly to exert oppositely directed pressures against the proximate ends of said shoes.

25. Brake mechanism comprising the combination of a brake drum, brake shoes engageable with said drum and having proximate free ends, brake-actuating means comprising pins free from positive connection with said brake shoes disposed between the proximate ends thereof, and actuating means for said brake shoes including hydraulic means to force said pins outwardly to exert oppositely directed pressures against the proximate ends of said shoes, said hydraulic means also being free from positive connection with said pins.

26. Brake mechanism comprising the combination of a brake drum, brake shoes engageable with said drum and having proximate free ends, brake actuating means comprising pins free from positive connection with said brake shoes disposed between the proximate ends thereof, and actuating means for said brake shoes including a hydraulic cylinder disposed between the proximate ends of said brake shoes and into the opposite ends of which cylinder and pins are extended, and opposing pistons disposed in said cylinder free from positive connection with said pins and arranged to force said pins outwardly into engagement with and move the ends of said brake shoes outwardly.

27. A brake comprising a friction element and a fluid operator, in combination with means through which the fluid operator thrusts directly against the friction element and which means is extensible to compensate for wear of the friction element without changing the idle position of the fluid operator.

28. A brake comprising a friction element and a cylinder and piston, in combination with thrust means between the piston and the friction element and which means is extensible to compensate for wear of the friction element without changing the idle position of the piston.

29. A brake comprising friction means having movable ends and having a cylinder and a pair of opposed pistons adjacent said ends, in combination with means through which said pistons thrust respectively against said ends and which means is extensible to compensate for wear of the friction means without changing the idle positions of the pistons.

30. A brake comprising, in combination, a drum, friction means engageable with the drum and including a single shoe anchored at one end and a plurality of connected shoes anchored adjacent the anchored end of the single shoe, the single shoe and one of the plurality of shoes having their ends separable to apply the brake, and a fluid-power actuator acting on said separable ends with substantially equal force and permitting movement of said ends different distances in applying the brake.

31. A brake comprising, in combination, a drum, friction means engageable with the drum and including a single shoe anchored at one end and a plurality of connected shoes anchored adjacent the anchored end of the single shoe, the single shoe and one of the purality of shoes having their ends separable to apply the brake, and a force-equalizing medium acting on said separable ends with substantially equal force and permitting movement of said ends different distances in applying the brake.

32. A brake comprising, in combination, friction means having ends movable different distances in applying the brake and anchored approximately one-third of the distance from one of said ends, and a fluid-power actuator acting on said ends with substantially equal force to apply the brake, regardless of their different movements.

33. A brake comprising, in combination, friction means having ends movable different distances in applying the brake and anchored approximately one-third of the distance from one of said ends, and a force-equalizing medium acting on said ends with substantially equal force to apply the brake, regardless of their different movements.

34. A brake comprising a drum and separable shoes within the drum and hydraulic actuating means adjacent the ends of said shoes and acting on the ends of said shoes to force the shoes apart against the drum, and which brake includes manually adjustable means for independently determining the released positions of said shoes respectively, and which last-mentioned means is adjustable while the brake is released to compensate for wear of the shoes.

35. A brake comprising a drum and separable shoes within the drum and hydraulic actuating means adjacent the ends of said shoes and acting on the ends of the shoes to force the shoes apart against the drum, and which brake includes devices on opposite sides of said actuating means for determining respectively the idle positions of said shoes and which are independently adjustable to compensate for wear of the shoes, and means for securely clamping said devices in their adjusted positions.

36. A brake comprising, in combination, a drum, a support at the open side of the drum, friction means within the drum, a hydraulic actuator for said means arranged within the drum, and fastenings for said actuator passing through said support and accessible from the outside of the brake.

In testimony whereof, we have signed our names to this specification.

WALLACE W. TUTTLE.
ERIK HIRVONEN.